United States Patent [19]

Aubriot

[11] 4,271,591
[45] Jun. 9, 1981

[54] PIPE-CUTTER WITH INTERCHANGEABLE CHAINS

[75] Inventor: Jean L. C. Aubriot, Damery, France

[73] Assignee: Virax, Epernay, France

[21] Appl. No.: 46,209

[22] Filed: Jun. 7, 1979

[30] Foreign Application Priority Data

Jun. 9, 1978 [FR] France .................................. 78 17722

[51] Int. Cl.³ ........................ B23D 21/06; B26B 27/00
[52] U.S. Cl. ..................................................... 30/100
[58] Field of Search .......................................... 30/100

[56] References Cited

U.S. PATENT DOCUMENTS

| 553,663 | 1/1896 | Anderson | 30/100 |
| 825,215 | 7/1906 | Holland | 30/100 |
| 1,112,728 | 10/1914 | Smith | 30/100 |
| 1,173,041 | 2/1916 | Saylor | 30/100 |
| 1,510,256 | 9/1924 | Conning | 30/100 |

Primary Examiner—Nicholas P. Godici
Assistant Examiner—J. T. Zatarga
Attorney, Agent, or Firm—A. W. Breiner

[57] ABSTRACT

The present patent relates to chain pipe-cutters equipped to cut all kind of material. The chain pipe-cutters include: a tensioner which is a deformable system formed by a cylindrical rod fast with a support, a slider slidably mounted on said rod, said support bearing four articulated rockers connected to the slider in pairs by two links and having their lower ends shaped as hooks to permit attachment of the chain thereon; said cylindrical rod cooperating with a handle through the agency of a screw-thread and said handle being formed by two superimposed cylindrical elements and having four superimposed lobes arranged cruciform-fashion.

3 Claims, 7 Drawing Figures

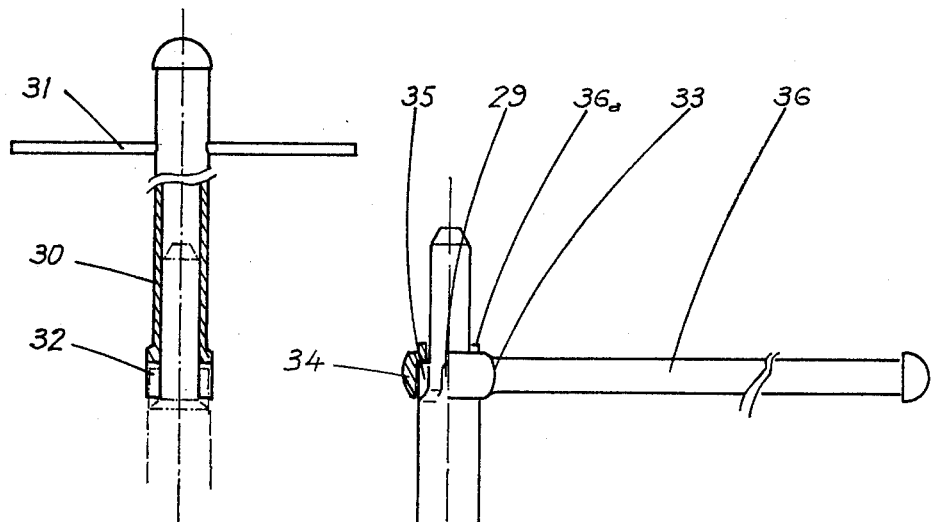
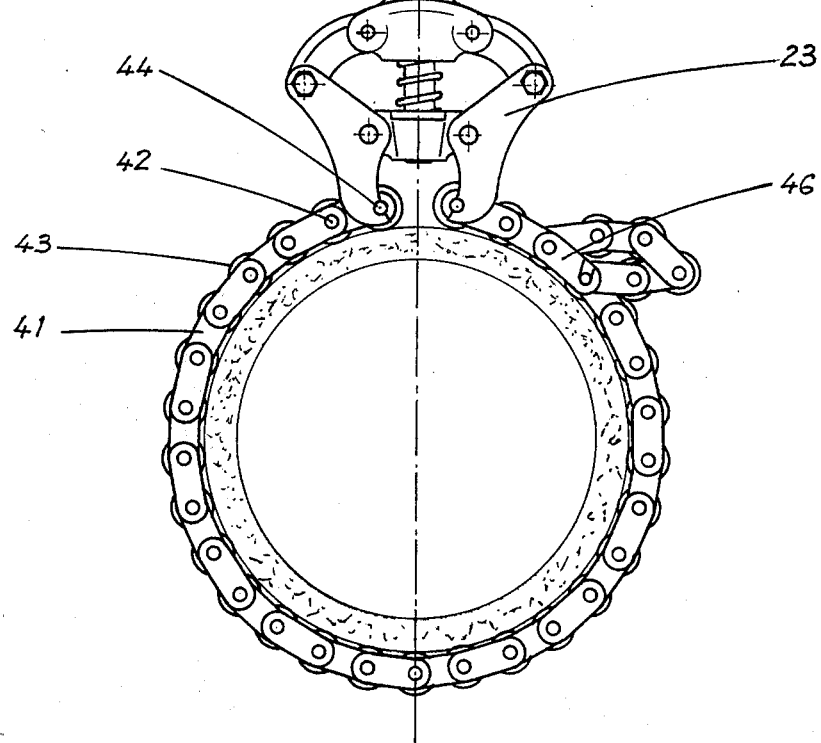

PIPE-CUTTER WITH INTERCHANGEABLE CHAINS

BACKGROUND OF THE INVENTION

The present invention relates to chain pipe-cutters of the kind used in sanitary engineering and public works for cutting pipes used in freshwater supply and waste water discharge networks. Such pipes are made of a variety of materials, particularly grey pig iron or ductile cast-iron, steel, sandstone, concrete, fibro-cement and plastics.

Prior-art pipe-cutters are normally adapted restrictively to cut only one kind of material, making it necessary to have different complete pipe-cutters or to carry out lengthy assembling and dismantling operations in order to adapt the pipe-cutter to the kind of material to be cut. Further, pipe-cutters used for cutting ferrous-metal pipes usually operate by angular displacement of the cutting chain, whereas pipe-cutters for sandstone, concrete or pipes operate by a bursting of the pipe by sheer constrictive pressure, without rotation. The chain tensioning systems consequently differ, the forces required with pressure-cutting being far greater than those required with rotation-cutting. This makes it necessary to have at least two pipe-cutters, thus entailing a comparatively large capital investment.

SUMMARY OF THE INVENTION

The subject pipe-cutter of this invention overcomes these drawbacks in that it uses but a single versatile tensioning system which can be equipped with any one of a selection of cutting chains suited to different materials, the fitting of any of these different cutting chains and its attachment to the tensioning system being accomplished readily. As a result, a kit composed of but a single tensioning system and a set of alternative chains enables the operator to set up the proper pipe-cutter adapted to the particular material to be cut, without the least difficulty or loss of time.

BRIEF DESCRIPTION OF THE DRAWINGS

FIGS. 3 and 3A show, respectively, the pipe-cutter in position on a pipe to be cut, equipped with a ratchet and pawl-type operating lever, or an alternative embodiment of operating mechanism;

In the drawings, like parts bear like reference numerals.

DETAILED DESCRIPTION OF A PREFERRED EMBODIMENT

Figure 1:
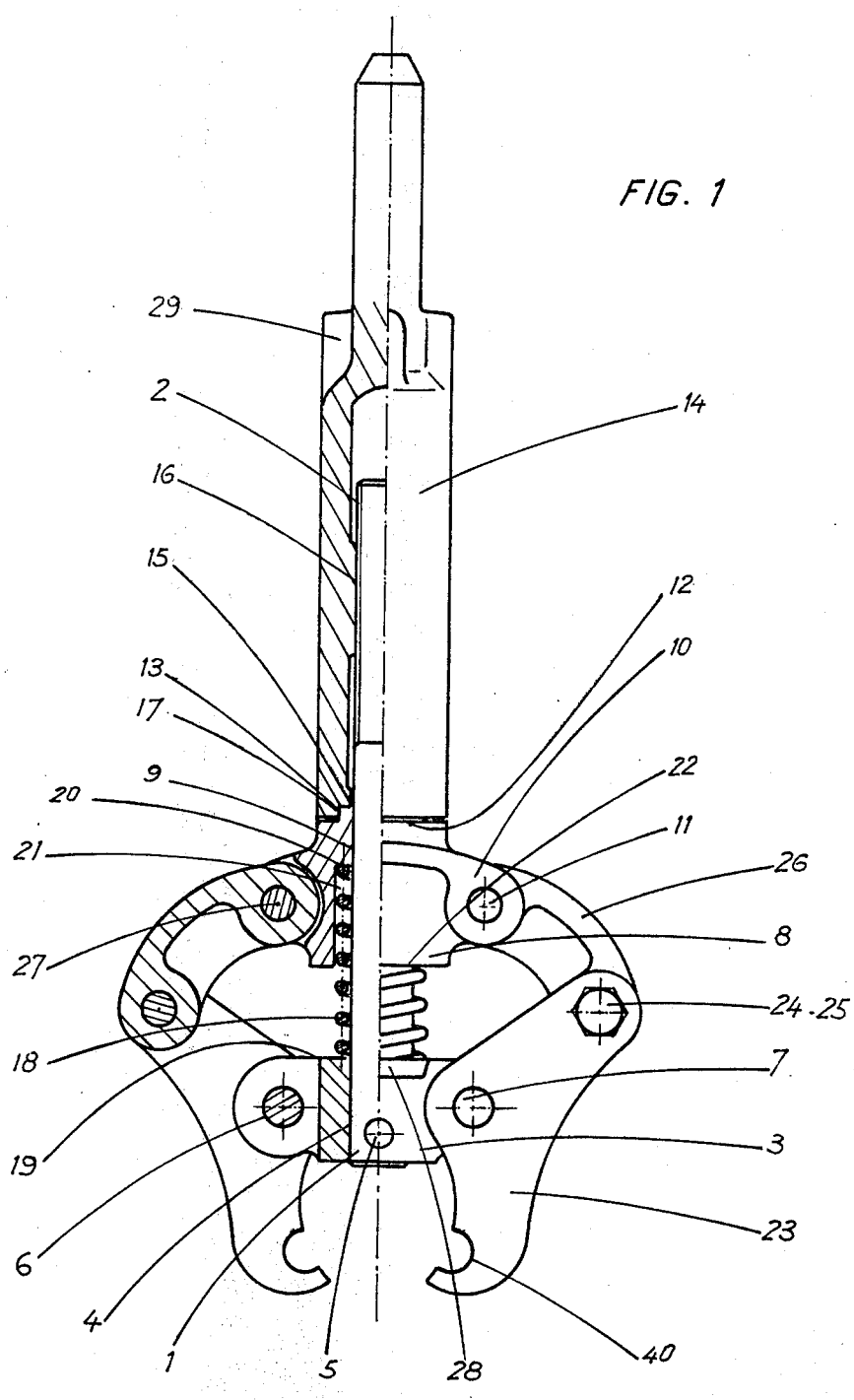
FIG. 1 is a front view in half-section of the single versatile chain tensioning system by itself.
Figure 2:
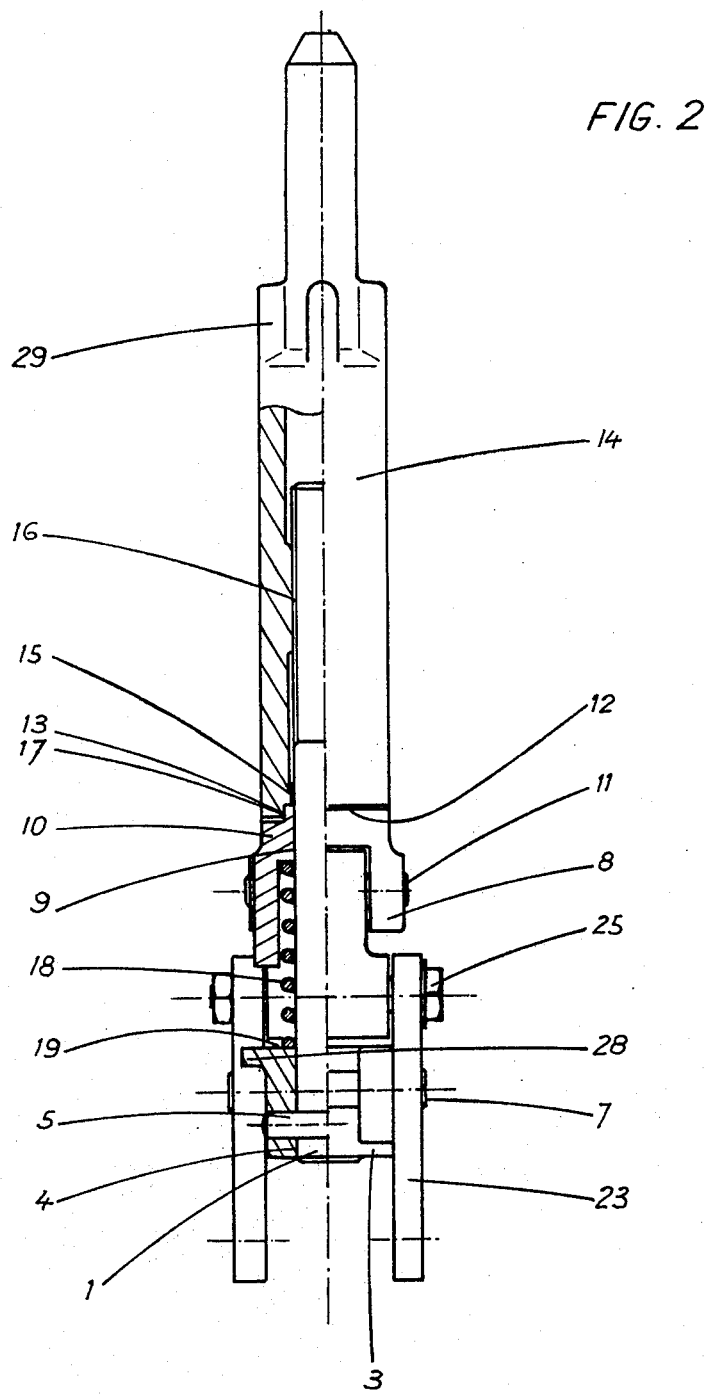
FIG. 2 is a corresponding side view in half-section.

As shown in FIGS. 1 and 2, the tensioning system consists of a cylindrical rod 1 having a threaded portion 2 at its upper end and having its lower end fast with a backing support 3 formed with a cylindrical bore 4 into which the end of said rod 1 is forcibly driven, a pin 5 extending through support 3 and rod 1 whereby to rigidly unite them. On either side of rod 1 and perpendicular to the axis thereof, the support 3 is formed with two bores 6 each receiving a force-fit peg 7 whereby to inhibit support 3 in rotation and translation. Engaged over rod 1 is a slider 8 cooperating with rod 1 through its bore 9 enabling it to slide freely over rod 1. The slider 8 bears two clevises 10 disposed on either side of the axis of rod 1.

These clevises are each traversed by a force-fitted pin 11 in order to be prevented from rotational or translational motion relative to slider 8. Formed on the upper face 12 of slider 8 is a cylindrical shoulder 13 concentric with the axis of rod 1. A generally cylindrically shaped rotary handle 14 is formed at its lower end with a bore 15 having a threaded portion 16 in mesh with the threaded portion 2 of rod 1. Another short bore 17 cooperates with shoulder 13 on the slider and centers the slider relative to handle 14. A compression coil spring 18 is engaged over rod 1 with its ends bearing respectively against the upper bottom 19 of support 3 and the face 20 of a recess 21 opening at the lower face 22 of the slider. This recess 21 is of sufficient depth to contain the spring 18 when it is compressed and to thereby enable the faces 19 and 22 to come into contact. Hingedly connected to pins 7, externally of the supports 3 and on either side thereof, are four rockers 23, each pin supporting two rockers. These rockers are generally L-shaped and have their arms directed respectively upwardly and externally of the tensioner. Formed in the end of the upwardly direction arm of each rocker is a cylindrical bore 24 through which extends a pin 25 formed with a shoulder and which interconnects the two rockers located on the same side of support 3. Mounted freely rotatable on pin 25, between the two rockers, is a link 26 the other end of which is formed with a bore 27 engaged for free rotation over pin 11. The tensioning apparatus thus constitutes a deformable system: as the handle 14 is screwed up, it thrusts slider 8 down the length of rod 1. The rockers, which are articulated on the pins 7, which are themselves fixed in relation to the rod, pivot in response to the thrust transmitted by the links 26. In its central part, the support 3 has a protrusion 28 which is symmetrical about the axis of rod 1 and against which abut the rockers 23 located on either side of said axis when the tensioner is opened to the maximum, that is, when handle 14 has been unscrewed, thus preventing an alignment of the tensioner hinges and a consequent blocking of the deformable system that would prevent tightening of the tensioner.

The handle 14 is formed of two superimposed cylinders, the upper cylinder being of smaller diameter than the lower cylinder. The lower cylinder is extended by four bosses 29 spaced at 90 degrees around the handle axis and forming a cross around the upper cylinder when viewed from the upper end of the handle. These bosses serve to rotate the handle when the chain is tightened around the pipe to be cut. As shown in FIGS. 3 and 3A, the pipe-cutter can be operated in an ordinary way by means of an extension tubular arm 30 having an actuating cross-bar 31 and formed in its lower portion with four notches 32 spaced 90 degrees apart and shaped to receive and cooperate with the bosses 29 whereby to make the tensioner angularly rigid with extension arm 30. An alternative well-known operating arm 33 is also shown. This arm 33 comprises a conventional pawl-and-ratchet mechanism 34 formed with four cathces 35 spaced 90 degrees apart and cooperating with the handle bosses 29, and of an actuating lever 36 extending at right angles to the axis. The upper part of mechanism 34 is formed with two bosses 36a at 180 degrees to each other and adapted to cooperate with the bosses when the actuating lever 36 is reversed upside down in order for the pipe-cutter to be loosened if necessary.

Figure 4:
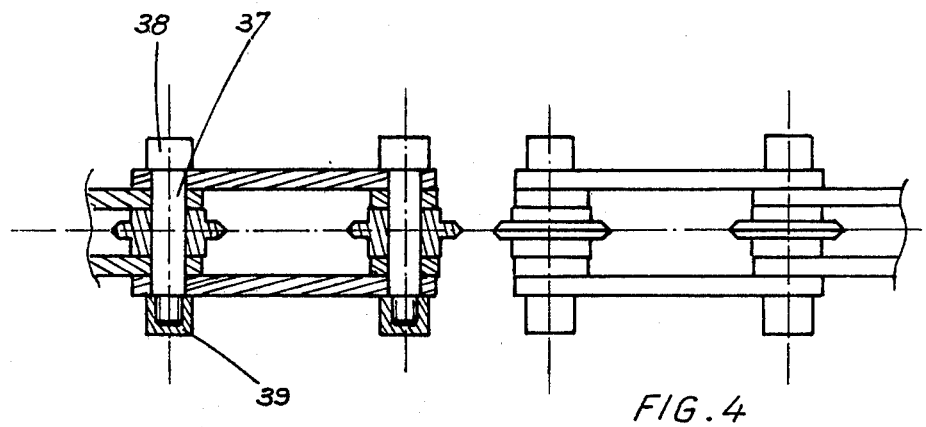
FIG. 4 shows both ends of a rotation-cutting chain, the left-hand end being shown in section.

This pipe-cutter can be fitted with different chains for pressure-cutting, or for rotation-cutting, or for use as a tube vice. As shown in FIG. 4, the rotation-cutting chain is conventionally formed of articulated links pivoting on pins 37 and kept transversely spaced apart by the cutting wheels. This arrangement is already described in French Patent No. 76.36872 entitled "Chain Pipe-Cutter". However, a difference resides in the link attachment method. In this case, the heads 38 of pins 37 and the nuts 39 project substantially on each side of the chain and serve for attachment purposes. The lower ends of the rockers 23 are shaped as hooks 40 and enable the chain to be hooked onto any one of the pins 37 to allow the length of the chain to be adjusted at will.

Figure 5:
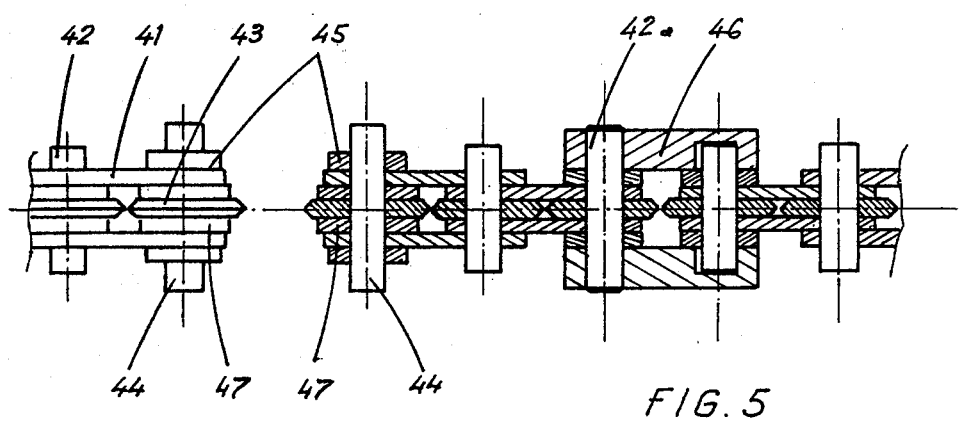
FIG. 5 shows both ends of a pressure-cutting chain, the right-hand end being shown in section.

As illustrated in FIG. 5, the pressure-cutting chain is formed of very short links 41 joined together by pins 42 projecting on either side of the links and each supporting a wheel 43 which additionally serves to keep the links 41 transversely spaced apart. The length of the links 41 is such that the wheels 43 are almost to each other. Each of the two terminal links bears a terminal pin 44 of sufficient length and diameter to enable the chain to be fastened between the hooks of the tensioner rockers 23, spacing washers 45 being provided to position the chain between the hooks. Further washers 47 maintain the spacing between the wheel and the links on either side. In order to enable the length of the chain to be adjusted (which cannot be accomplished by rotation as with the cutting-chain since only the pins of the terminal links are designed to be hooked to the tensioner), a pin 42a located as close as possible to one end of the chain bears two hooks 46 which are articulated about it on each side of the chain. By causing these hooks to engage with any convenient pin 42, it is possible to "bypass" a number of links and thus impart to the chain the length appropriate for cutting a pipe of given diameter.

Figure 6:
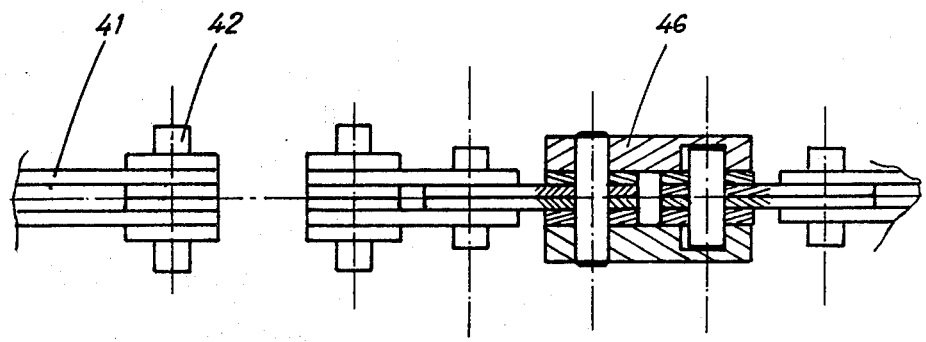
FIG. 6 shows both ends of a chain used as tube vice, the right-hand end thereof being in partial section.

As shown in FIG. 6, the clamping chain is made up of the same links 41 and the same pins 42 as the cutting chain. There is the same provision for length adjustment by shortening the chain by bypassing a number of links by means of hooks 46. Thus the system can be used as a pipe clamp, which can be particularly useful when a pipe must be prevented from rotating.

The manner of operation of the above-described pipe-cutter is as follows. The pipe-cutter is equipped with the chain appropriate to the nature of the pipe to be cut: a rotation-cutting chain (as shown in FIG. 4) for cast-iron or steel; a pressure-cutting chain (as shown in FIG. 5) for fibro-cement, concrete or sandstone; and if necessary a chain vice (as shown in FIG. 6) to prevent a pipe made of any material from rotating. The length of the chain is adjusted as described hereinbefore, after which the operator actuates the tensioning system by means of pawl-and-ratchet arm 33 or extension arm 30. The tightening force exerted by the operator is amplified and transmitted to the cutting chain by the deformable linkage system. This tightening force, coupled if necessary with a two-and-fro rotating motion, results in penetration of the wheels into the material until the pipe is severed.

I claim:

1. A chain pipe-cutter kit comprising a set of selectively-interchangeable constriction chains having two free ends and including a rotation-cutting chain and a pressure-cutting chain, and a chain tensioning system for operative actuation of any selected one of said chains in conjunction with a pipe to be cut by chain constriction, said chain tensioning system comprising:
   a generally cylindrical rod having an outer threaded portion at one end thereof and a backing support member at its other end;
   a slider movable along said rod between said threaded portion and backing support member thereof;
   four rockers hinged to said support member at a medial point of each rocker;
   two links hinged on the one hand to one end of said rockers and on the other hand to said slider;
   hooks formed at the other end of said rockers and facing inwardly opposite one another, said hooks being designed for engaging firmly said two free ends of any selected one of said chains;
   a rocker control rotary handle having an open end bore formed therein to house the threaded portion of said cylindrical rod, said bore having an inner threaded portion in mesh with said outer threaded portion and an open end adjacent said slider, said handle having at a part thereof remote from said slider four bosses in cruciform distribution;
   a compression coil spring fitted around said cylindrical rod and extending between said backing support member and said slider to urge the same apart, and
   a handle actuator device designed for removable engagement with said handle to rotate the same, and comprising operative means adapted to clutch with said cruciform bosses, and a hand-actuated member cooperating with said operative means to drive said bosses in rotation.

2. Pipe-cutter kit as claimed in claim 1, wherein said set of constriction chains further includes a tube-vice chain.

3. Pipe-cutter kit as claimed in claim 1, wherein said handle actuator device comprises a set of two selectively-interchangeable actuators, namely:
   an extension tubular arm having an operative end adapted to mesh with said cruciform bosses of said rotary handle when said tubular arm is engaged over said boss carrying part of said handle, and a hand-actuated cross-bar engaging said tubular arm, and
   a rotary arm provided with a pawl-and-ratchet mechanism having operating catches adapted to mesh with said cruciform bosses of said rotary handle when said rotary arm is engaged over said boss carrying part of said handle, and a hand-actuated lever fast with said rotary arm.

* * * * *